FIG. 1a.
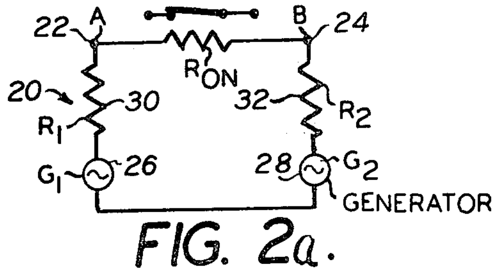
FIG. 1b.
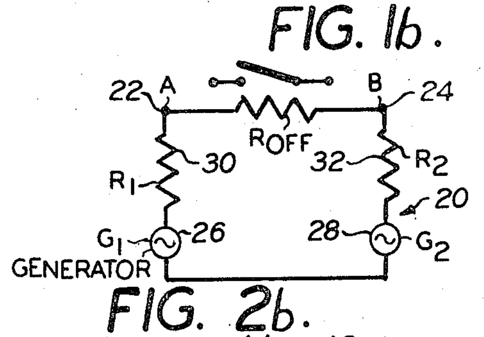
FIG. 2a.
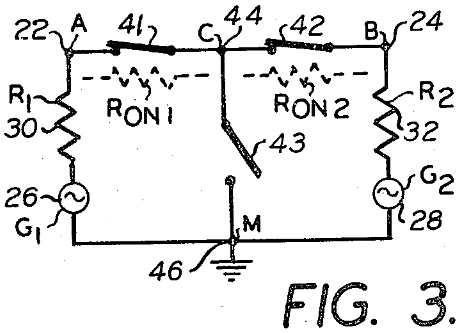
FIG. 2b.
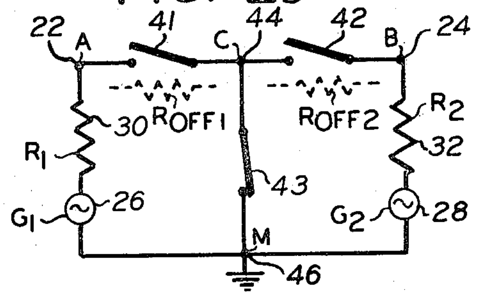
FIG. 3.
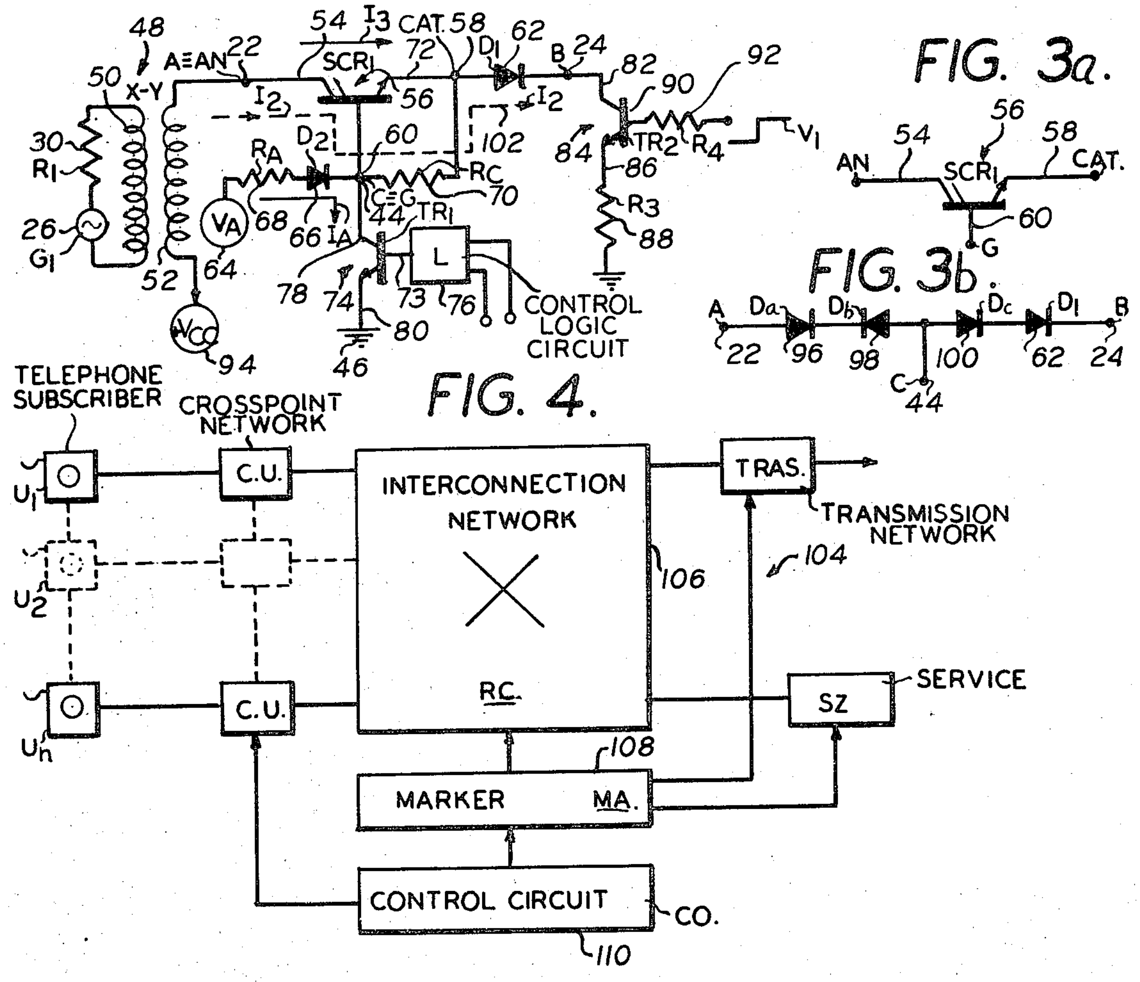
FIG. 3a. FIG. 3b. FIG. 4.

3,720,792

ELECTRONIC CROSSPOINT NETWORK WITH SEMICONDUCTOR SWITCHING

Albert Resta, Milan, Italy, assignor to Telettra-Laboratori di Telefonia Elettronia e Radio S.p.A., Milan, Italy Filed Mar. 10, 1971, Ser. No. 122,978
Claims priority, application Italy, Mar. 13, 1970, 21,881/70
Int. Cl. H04q 3/50
U.S. Cl. 179—18 GF 14 Claims

ABSTRACT OF THE DISCLOSURE

A switching apparatus includes an electronic crosspoint network for providing full electronic connection or disconnection between at least two points whose interconnection provides the particular crosspoint. The network has an open circuit condition, in which a very high OFF impedance is provided, and a closed circuit condition, in which a very low ON impedance is provided. The network includes at least two series connected semiconductor branches and a third parallel connected semiconductor branch, which is coupled to ground, connected in between. In the open circuit condition, the series branches do not conduct and the parallel branch does, providing a short to ground; whereas, in the closed circuit condition, the opposite occurs, providing an open circuit to ground. The parallel branch is controlled in accordance with the desired crosspoint switching function provided via a logic network. If desired, two such crosspoint networks may be coupled together in a two-wire circuit to simultaneously control two crosspoints. The crosspoint network is preferably utilized to interconnect points to which signals, such as telephone speech signals, are applied, a plurality of such networks being provided in the matrix arrays of a space-division telephone switching network.

BACKGROUND OF THE INVENTION

Field of the invention

The present invention reltaes to a switching apparatus for providing fully electronic crosspoints between at least two points to be coupled or decoupled and more particularly to telephone switching systems in which a high cross-talk loss is provided in the decoupled state and a minimum loss useful signal is provided in the coupled state of the crosspoint switching apparatus.

DESCRIPTION OF THE PRIOR ART

Many prior art attempts have been made to produce electronic crosspoints for space-division telephone networks. One such well known apparatus of this type includes a silicon-controlled rectifier connected in series with an insulation diode, such as disclosed in French Pat. No. 1,494,964 assigned to the International Business Machines Corporation (I.B.M.), Netherlands patent application 6814824, also assigned to I.B.M., the article by De Droes entitled, "Switching Network Using PNPN Transistors in an Experimental Telephone Exchange," in the French publication "Colloque International de Communication Electronique," Paris 1966 (editions Chiron), pages 189 through 195, and the article by Monin entitled, "Concentrateur Electronique à 200 Direction," in the French publication, "Communication Electronique," No. 6, April 1964, pages 100 through 115. Although the prior art electronic crosspoint networks of the type disclosed in these references have certain advantages, they nevertheless do not satisfy all requirements. Namely, either undesirable crosstalk losses are still present or the useful signal loss is undesirable. None of the prior art electronic crosspoint networks sufficiently satisfy the criteria of high crosstalk loss in the decoupled or open state and minimal useful signal loss in the coupled or closed state when utilized to interconnect points receiving speech type signals, such as in the matrix arrays of a space-division telephone network. Furthermore, such prior art crosspoint networks employing a single semiconductor branch of an SCR in series with an insulation diode do not, under the same operating conditions, yield results which are at least comparable to those provided by conventional mechanical relays. These prior art semiconductor crosspoint networks have not been able to utilize all the advantages to be gained by the use of a semiconductor crosspoint network and, thus, are inefficient. In addition, such prior art networks do not provide either a selectively activated short circuit path to ground for the crosstalk currents in the decoupled or open circuit state of the crosspoint network, or an efficient means for minimizing capacitive loads, such as due to interelectrode capacitances, on the crosspoint or interconnection path.

In attempting to utilize these prior art crosspoint networks in space-division telephone networks having multi-array interconnection networks connected to one another through links and/or junctors, where each point of intersection in an array is provided with a crosspoint network, unsatisfactory results have been obtained. This is in part due to the inefficiencies in these prior art crosspoint networks, discussed above, and the lack of a simple and efficient control system for both the individual electronic cross point networks and the overall system of crosspoint networks in toto. Thus, despite the inherent disadvantages of conventional mechanical relays, such as their being cumbersome and heavy, having high power requirements, being relatively slow, and having a relatively short life, all of which it was originally anticipated would be overcome by the prior art electronic crosspoint networks, such prior art networks have not proved a satisfactory substitute, particularly with respect to crosstalk loss which has not been as high as desirable, and accordingly, such networks have not gained the wide acceptance originally anticipated therefor.

These disadvantages of the prior art are overcome by the present invention.

SUMMARY OF THE INVENTION

A switching apparatus is provided which includes an electronic crosspoint network having a closed circuit condition and an open circuit condition, the crosspoint network having a substantially low ON impedance in the closed circuit condition and a very high OFF impedance in the open circuit condition. The crosspoint network provides full electronic connection between at least two points whose interconnection provides the particular crosspoint. The crosspoint network, which is preferably utilized to interconnect points to which electronic signals such as telephone speech signals are applied, provides a high crosstalk loss in the open circuit or decoupled condition and a minimal loss for the useful or actual information signal in the closed circuit or coupled condition. The network includes at least two series connected semiconductor branches, such as an SCR type means and a diode means connected in a series configuration, and a third parallel connected semiconductor branch, such as including a transistor type means, connected in between the series branches, the parallel branch being further connected to ground. The parallel connected semiconductor branch is controlled by a logic circuit, such as a flip-flop, in accordance with the desired crosspoint network switching function. In the network open circuit condition, the series connected semiconductor branch is biased to conduction, providing a short circuit path to ground. In the network closed circuit condition, the series connected semiconductor branches are biased to conduction, in terconnecting the points so as to couple the crosspoint circuit, and the parallel connected semiconductor branch does not conduct, provided an open circuit path with respect to ground. Two such crosspoint networks can be coupled together in a two-wire circuit in order to provide simultaneous control of two crosspoints.

A space-division telephone switching network is provided in which a plurality of electronic crosspoint networks of the type described above are utilized at the crosspoints of the matrix arrays of the telephone switching network. A compensating circuit, such as including a semiconductor configuration, is associated with each of the respective crosspoint networks of the telephone switching network for providing a negative impedance to the crosspoint network which compensates for the leakage impedance occurring in the associated crosspoint network in the closed circuit condition thereof.

BRIEF DESCRIPTION OF DRAWING

FIGS. 1*a* and 1*b* are pictorial illustrations, partially in schematic, of a conventional crosspoint network;

FIGS. 2*a* and 2*b* are pictorial illustrations, partially in schematic, of a crosspoint network in accordance with the present invention;

FIG. 3 is a schematic diagram of the preferred embodiment of the crosspoint network of FIGS. 2*a* and 2*b*;

FIG. 3*a* is a schematic diagram of a conventional silicon controlled rectifier;

FIG. 3*b* is a schematic diagram of a portion of the equivalent circuit of FIG. 3;

FIG. 4 is a block diagram of a space-division telephone network;

DETAILED DESCRIPTION OF THE PREFERRED EMBODIMENTS

Crosspoint network

Figure 5:
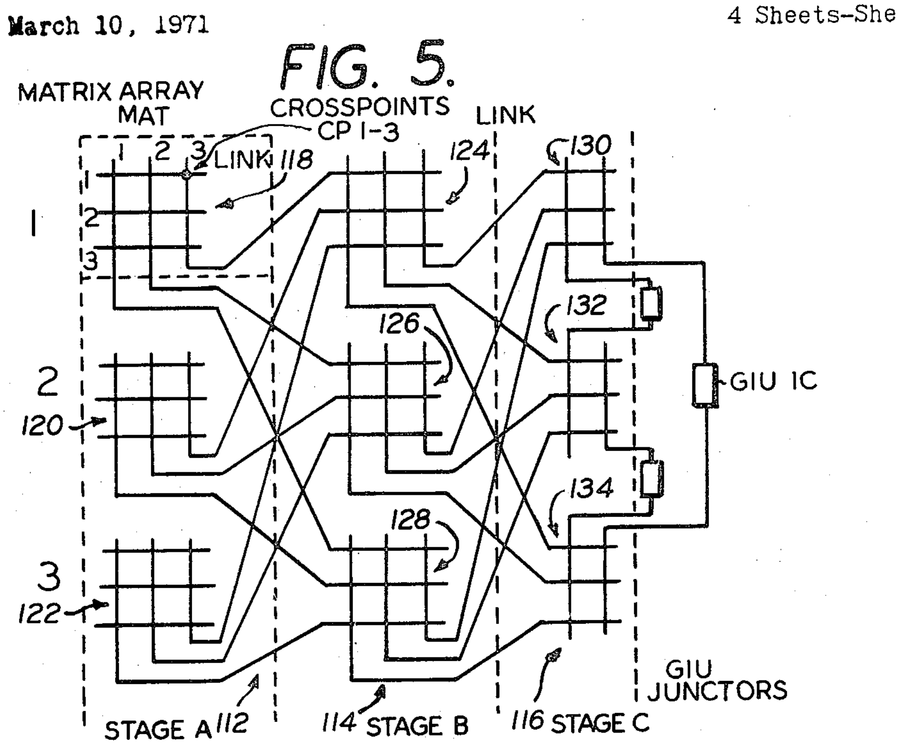
FIG. 5 is a pictorial illustration of the switching network portion of FIG. 4, showing some of the crosspoints.

Referring now to the drawings in detail, and especially to FIGS. 1*a* and 1*b* thereof. FIGS. 1*a* and 1*b*, illustrate a crosspoint (CP), generally referred to by the reference numeral 20, in a closed (FIG. 1*a*) and open circuit (FIG. 1*b*) condition, respectively. The purpose of the crosspoint network 20 is to connect together at least two points 22 and 24, designated A and B by way of example, where signals are applied, such as speech signals, which are represented by generators 26 ($G_1$) and 28 ($G_2$) having associated internal resistances 30 ($R_1$) and 32 ($R_2$), respectively. It is preferred that the ON circuit impedance for the closed circuit condition between points A and B, represented by impedance 34 ($R_{ON}$) in FIG. 1*a* be substantially low, (preferably zero in the limit) with respect to the open circuit condition impedance between points A and B, represented by impedance 36 ($R_{OFF}$) in FIG. 1*b*. A very low ON impedance for the closed circuit condition is necessary for minimizing useful signal loss at the crosspoint, while a very high OFF impedance for the open circuit condition is necessary in order to achieve optimum decoupling between points A and B.

The preferred embodiment of a crosspoint network in accordance with the present invention is illustratively shown in FIGS. 2*a* and 2*b*, where switches or contacts 41, 42 and 43 are inserted between points A and B, which are the points to be connected together and disconnected by the crosspoint network in the example shown. These switches 41, 42 and 43 have a common junction point 44 (C); hence, two switches 41 and 42 are in series, whereas the third switch 43 is inserted between junction point 44 (C) and ground 46 (M) or reference potential. As shown in FIG. 2*a*, when points A and B (22 and 24) are connected together, switches 41 and 42 are closed, whereas switch 43 is open. The total ON impedance for this closed circuit condition results from the addition of the partial impedances ($R_{ON1}$ and $R_{ON2}$) associated with switches 41 and 42. However, this impedance may be too high and, hence, the signal flowing from A to B, through switches 41 and 42 and vice-versa, would be highly attenuated. However, as will be explained in greater detail hereinafter, the preferred crosspoint network of the present invention overcomes this problem. As shown and preferred in FIG. 2*b*, the crosspoint network 20 made according to the present invention, as will be explained in greater detail hereinafter, provides a high OFF circuit impedance for the open circuit condition between points A and B. Since switches 41 and 42 are in series, the total OFF circuit impedance equals the sum of the impedances ($R_{OFF1}$ and $R_{OFF2}$) associated with switches 41 and 42. Moreover, the presence of switch 43 which is closed when switches 41 and 42 are open, short-circuits the signal which may be applied to junction point 44 (C) to ground thereby providing a practically infinite impedance decoupling between points A and B.

Referring now to FIG. 3, which shows the preferred semiconductor crosspoint network 20 of the present invention. For purposes of explanation, it is assumed that the useful signal or desired information signal supplied by generator 26 ($G_1$) having internal resistance 30 ($R_1$), is power fed to point A (22) by a conventional isolating transformer 48 (X–Y) having a primary 50 (X) and a secondary 52 (Y). Point A (22) is connected to the anode 54 (AN) of a silicon controlled rectifier 56 ($SCR_1$), also shown symbolically in FIG. 3*a*, having a cathode 58 (CAT) and gate 60 (G) in addition to the anode 54. Point A (22) is illustratively shown as being coincident wtih the anode ($A=AN$). The cathode 58 (CAT) of the SCR 56 is directly connected to a diode 62 ($D_1$) which is connected between the cathode 58 and point B (24) to which point A (22) is to be connected to permit the transmission of the useful signals, as will be explained in greater detail hereinafter. The SCR 56 and diode 62, therefore, correspond to series switches 41 and 42 of FIGS. 2*a* and 2*b*. The gate 60 of the SCR 56 coincides with the junction point C ($C=G$) 44 of FIGS. 2*a* and 2*b*. This common junction point 44 is connected on one side to a voltage source 64 ($V_A$) through another diode 66 ($D_2$) and an impedance 68 ($R_A$), and on the other side, through an impedance 70 ($R_C$), to the cathode 58 of the SCR and to diode 62 at point 72. The gate 60 of the SCR 56 is also coupled to the collector 78 of a transistor 74 ($TR_1$) which is, in turn, driven by a control logic circuit 76 (L), to be described in greater detail hereinafter, in response to external control signals. The transistor 74 also has a collector 78, which is coupled to junction point 44, and an emitter 80, which is coupled to ground 46. Point B (24) is further coupled to the collector 82 of another transistor 84, which also has an emitter 86, which is coupled to ground through an impedance 88 ($R_3$), and a base 90 having an impedance 92 ($R_4$) connected thereto. Anode 54 of SCR 56 preferably receives a bias voltage $+Vcc$ from a voltage source 94 through the secondary 52 of the transformer 48. By way of example, as shown and preferred, transistors 74 and 84 are NPN transistors, although other transistor types, such as PNP, may be utilized. A diode has a low impedance during conduction, such as when it is forward biased; and a high impedance when it is reverse biased and, hence, is not conductive. In addition, an SCR, which has two stable states, OFF and ON, may be changed from the OFF to the ON state by either increasing the anode-cathode junction voltage beyond a pre-determined limit, or by current or voltage controlling the gate. Accordingly, in the circuit of FIG. 3, both the diode 62 and the SCR 56 switches are crossed by a D.C. bias voltage in the ON state, whereas, in the OFF state, they are not biased; hence, no current can flow through them. This explains the presence of $Vcc$ (94) and $TR_2$ (84) in the circuit.

OPERATION

In order to understand the operation of the circuit shown in FIG. 3, it is useful to remember the conventional diagram of an SCR where the silicon controlled rectifier is represented by three successive diodes where the first diode is placed back-to-back with the second diode but in the same direction as the third diode. Hence, the SCR-diode configuration 56–62 of FIG. 3 can be represented, as shown in FIG. 3*b*, by four diodes 96, 98, 100 and 62 (D*a*, D*b*, D*c* and D*l*, respectively) between points A and B, with only diode 98 being in the opposite direction with respect to the remaining three dioes 96, 100 and 62. In the open circuit condition, that is with SCR 56 and diode 62 OFF or not conducting and thus not crossed by the bias current, transistor 74 is biased to saturation by the logic circuit 76, whose operation will be described in greater detailed hereinafter. Hence, transistor 74 short-circuits to ground, causing the current $I_A$ (denoted by the solid line arrow) which is supplied by source 64 through impedance 68 and diode 66 to be shorted to ground 46, thereby creating a low impedance at junction point 44. In other words, it performs the function of ON switch 43 in FIG. 2*b*. In this open circuit condition, SCR 56 and diode 62 are inhibited, and transistor 84 is inhibited, having its base grounded; hence, voltage generator 94 does not yield current. In the closed circuit condition, both SCR 56 and diode 62 are conductive, and the base 90 of transistor 84 is provided with a voltage $V_1<Vcc$; hence, voltage generator 94 and transistor 84 supply the bias voltage to SCR 56 and diode 62.

The conduction state for SCR 56 and diode 62, which provides the closed circuit condition for network 20 is obtained from the open circuit condition (both SCR 56 and diode 62 being OFF) in the following manner. A voltage or potential $V_1<V_A$ is applied to transistor 84, which, in the open circuit condition of network 20, has its collector 82 OFF. However, when voltage $V_1<V_A$ is applied to transistor 84, it becomes saturated, and a voltage practically equal to $V_1$ appears at point B (24). At this point, logic circuit 76 changes transistor 74 from saturation to inhibition. Since $V_A$ is higher than $V_1$ and, therefore, higher than the voltage or potential at point B (24), a current $I_2$ is established (indicated with a dashed line arrow 102 in FIG. 3) which, with the voltage drop caused across impedance 70, biases the gate-cathode junction 60–58 of SCR 56 up to its firing voltage. The circuit between points A and B (22 and 24) is then closed and a current $I_3$ starts flowing; hence, biasing SCR 56 and diode 62. Transistor 84 is then no longer saturated and becomes a current generator. At this point, a D.C. voltage about equal to $Vcc$ is established at points A, B and C (22, 24 and 44), diode 66 is reverse biased and thereby inhibited, and point C (44) is practically disconnected from group, as is the circuit between points A and B (22 and 24). Diode 62, which corresponds to the second switch 42 of FIGS. 2*a* and 2*b*, is, therefore, driven by the closure of SCR 56; that is, it is dependent on the state of SCR 56. More precisely, the equivalent of opening switch 43 of FIGS. 2*a* and 2*b* causes the following chain of reaction: closure of switch 41 (SCR 56), closure of switch 42 (diode 62) and inhibition of diode 66, thereby disconnecting series switches 41 and 42 from ground and placing network 20 in the closed circuit condition with SCR 56 and diode 62 being conductive or ON.

Now describing the operation of network 20 in providing an open circuit condition from this closed circuit condition. Switches 41 and 42 (SCR 56 and diode 62) are driven to opening by interruption of the current supplied by the current generator, transistor 84. This interruption is accomplished by bringing applied voltage $V_1$ to zero value. In addition, transistor 74 is switched ON by a control from logic circuit 76, thereby short-circuiting the current supplied by voltage generator $V_A$ (64) to ground and, hence, creating a low impedance at point C (44), as will be explained later, notably improves the characteristics of the rank of switches with regard to crosstalk. The gate-cathode junction 60–58 is reverse biased and SCR 56 is blocked definitely, placing network 20 in the open circuit condition.

SPACE-DIVISION TELEPHONE NETWORK

Now, by way of example, describing a preferred use of the electronic crosspoint network 20, described above, in interconnection matrix arrays of a space-division telephone network, although other uses will become apparent to one of ordinary skill. Generally, a space-division telephone network is connected to a certain number of subscribers ($U_1$, $U_2$ . . . $U_m$ . . . $U_n$) and to other exchanges or telephone networks. The primary purpose of the exchange or telephone network is to establish conversation paths between pairs of subscribers connected to the same exchanger or to different exchanges. A typical conventional exchange 104, by way of example, which provides such an interconnection path is shown in FIG. 4. where RC denotes the interconnection network 106, MA denotes the marker 108, and CO the control circuit 110, marker 108 and control circuit 110 comprising and the control devices which control the interconnection network 106 and furnish to subscribers the other service (SZ) commonly associated with an exchange 104 of the type illustrated in FIG. 4.

The interconnection network 106 is formed by a certain number of stages, illustratively shown in FIG. 5 as comprising three such stages 112, 114 and 116 (STA, STB and STC) by way of example. FIG. 5, for purposes of clarity and simplicity, represents an interconnection network 106 which establishes links only with subscribers connected to the same exchange. As can be seen by reference to FIG. 5, the three stages 112, 114 and 116 shown by way of example, each include a plurality of matrix arrays (MAT). By way of example, stages 112 and 114 each include three 3-by-3 matrix arrays, 118, 120 and 122 for stage 112, and 124, 126 and 128 for stage 114; and stage 116 includes three 3-by-2 matrix arrays 130, 132 and 134. For purposes of explanation, a crosspoint (CP), which is defined as the interconnection of a row and a column in an array, inside a given matrix array, will be identified by a notation consisting of a pair of symbols (references) denoting the number of the array being examined and the stage as well as a number denoting the row (RG) and a number denoting the column (CL) where the particular crosspoint is located. For example, the crosspoint indicated in FIG. 5 will be denoted by 1 A 13; that is, array 1, stage A, row 1 and column 3.

Figure 6A:
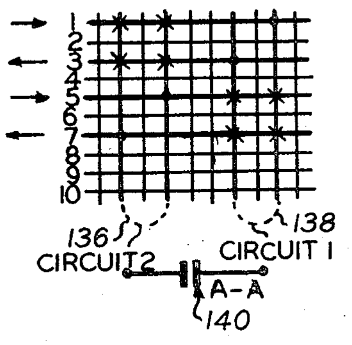
FIGS. 6*a*, 6*b* and 6*c* is a pictorial illustration of the interferences present between two conversation paths in an array in the switching network portion of FIG. 4.
Figure 6B:
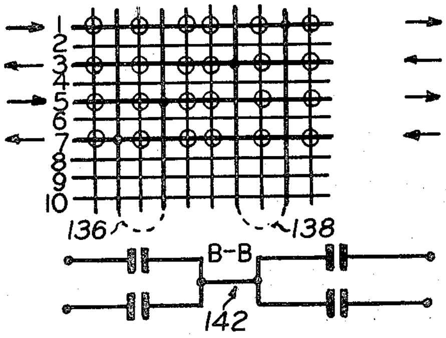
Figure 6C:
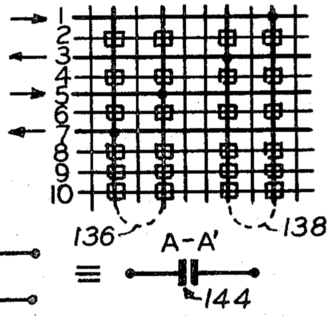

Now considering all the possible interferences between two conversation paths in the same interconnection network, with reference to FIGS. 6*a*, 6*b* and 6*c*, so as to establish the minimum impedance required for the open-circuit condition of a crosspoint. Assuming, for purposes of illustration, that subscriber $U_1$ is connected to subscriber $U_3$ and that subscriber $U_5$ is connected to subscriber $U_7$. The continuity of these two circuits with the remaining network has been indicated by dashed lines and precisely by $CIRC_2$ 136 for the continuity of the circuit between subscribers $U_5$ and $U_7$ and by $CIRC_1$ 138 for the continuity of the circuit between subscriber $U_1$ and $U_3$. By suitably arranging the links within the various arrays, it can be insured that circuits $CIRC_1$ and $CIRC_2$ (136 and 138) do not cross other arrays simultaneously. The case indicated in FIGS. 6*a*, 6*b* and 6*c* is the worst case condition, since conversations established over adjacent rows of the same array, produce the maximum crosstalk loss. An analysis of all the possible interferences, indicates that these interferences are distinguished by two types. One type is due to direct parasitic coupling (essentially capacitive) through a single crosspoint (in FIG. 6*a* the couplings which provide the crosspoint are denoted by a dot (·) whereas parasitic couplings are denoted by an X). These direct parasitic couplings can be schematically represented by a capacitor A—A (140). The other type of interference is the type due to indirect parasitic coupling, due to transit through two crosspoints, which is further subdivided into (i) indirect parasitic coupling of the vertical type, viz, passing over the columns, as shown in FIG. 6*b* where these couplings are represented by circle (o); and (ii) indirect parasitic coupling of the horizontal type, viz, passing over the rows, as shown in FIG. 6*c* where these couplings are represented by squares (□). These last two types of interferences due to indirect parasitic coupling may be represented as in the lower section of FIGS. 6*b* and 6*c*, viz. by two series groups of two parallel capacitances B—B (142) which may be thought of as series capacitance A–A′ (144), corresponding to capacitance A—A (140). Always referring to FIGS. 6*a*, 6*b* and 6*c* and, hence, to a 10-by-10 matrix, there are eight couplings of the A—A or direct parasitic type and twelve couplings of the B—B or indirect parasitic type which, when considering that there are two parallel paths and two series contacts, equals twelve couplings of the direct A–A′ type, that is, equivalent to the A—A type. There are twenty parallel paths in all; hence, as the experts in these techniques know, the crosstalk loss in this array is 26 db lower than the loss in each single crosspoint.

Figure 7:
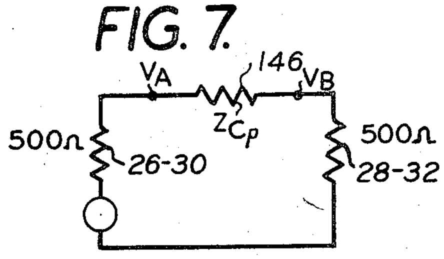
FIG. 7 is a pictorial illustration, partially in schematic of an example of an equivalent circuit of FIGS. 1*b* and 2*b*.

If, for example, a 75 db crosstalk loss is desired, crosspoint CP must have a loss higher than 101 db (75+26) and, considering that besides the capacitive couplings already examined, there are other risks interferences between circuits, such as inductive losses, common grounds, etc., such a crosspoint should ensure at least a 110 db loss. Assuming, by way of example, that the circuits schematically represented by $G_1$–$R_1$ (26–30) and $G_2$–$R_2$ (28–32) of FIG. 1*b* each have 500-ohm impedance, as represented by the circuit of FIG. 7, where $z_{cp}$ denotes the open circuit crosspoint impedance 146 and $V_A$ and $V_B$ the signal voltage across it, the value of $Z_{cp}$ necessary for obtaining a 110 db loss for crosspoint network 20, is derived as follows:

$$20 \log \frac{V_A}{V_B}=110 \text{ db, which with } \frac{V_A}{V_B}=3\times 10^5 \text{ and}$$

$$\frac{V_A}{V_B}\simeq\frac{Z_{cp}}{500} \text{ yields } Z_{cp}=500\times 3\times 10=150 \text{ Mohms}$$

The open crosspoint impedance, for the example given, must, therefore be higher than 150 Mohms, which in the range of voice or speech frequencies corresponds to a capacitance lower than 1 pf. Such a crosspoint exhibiting these loss characteristics with open circuit, may be realized with the crosspoint network 20 of the present invention wherein a short circuit point for crosstalk currents is provided. By way of illustration, for the values given above, losses greater than 120 db for a single crosspoint and 95 db for a single array have been achieved using the crosspoint network of the present invention in a matrix array of a telephone switching network.

Figure 8:
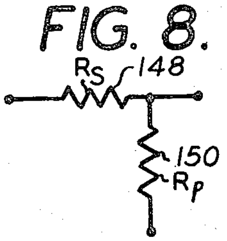
FIG. 8 is a pictorial illustration, partially in schematic of an equivalent circuit of FIGS. 1*a* and 2*a*.
Figure 9:
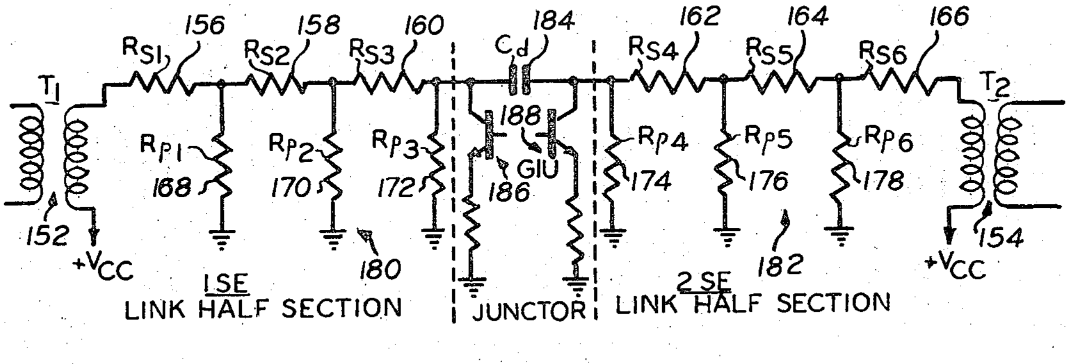
FIG. 9 is a schematic diagram of an illustrative example of a link portion of the switching network portion of FIG. 4 in accordance with the preferred embodiment of the present invention.

Referring now to the closed circuit condition for the crosspoint network of the present invention. The system of contacts proposed can be schematically represented as shown in FIG. 8, where $R_S$ (148) denotes the contact series resistance and $R_p$ (150) the leakage current, if any, to ground. The loss for a complete circuit is the one due to all the cascaded contacts in a link. FIG. 9 schematically represents a link with six contacts. Omitting the loss inserted by isolating transformers $T_1$ and $T_2$ (152 and 154), for purposes of explanation, the loss due to the interconnection network 106 proper results from the addition of series impedances $R_{S1}$ to $R_{S6}$ (156 through 166, inclusive), and from the parallel of impedances $R_{P1}$ to $R_{P6}$ (168 through 178, inclusive) to ground. Impedances 156, 158, 160, 168, 170 and 172 belong to the first link half-section 180 (1 SE) which is coupled to the second link half-section 182 (2 SE), which includes impedances 162, 164, 166, 174, 176 and 178, through a capacitance 184 (CD) and junctors (GIU.) 186–188, which are current generator type connecting links.

Figure 10A:
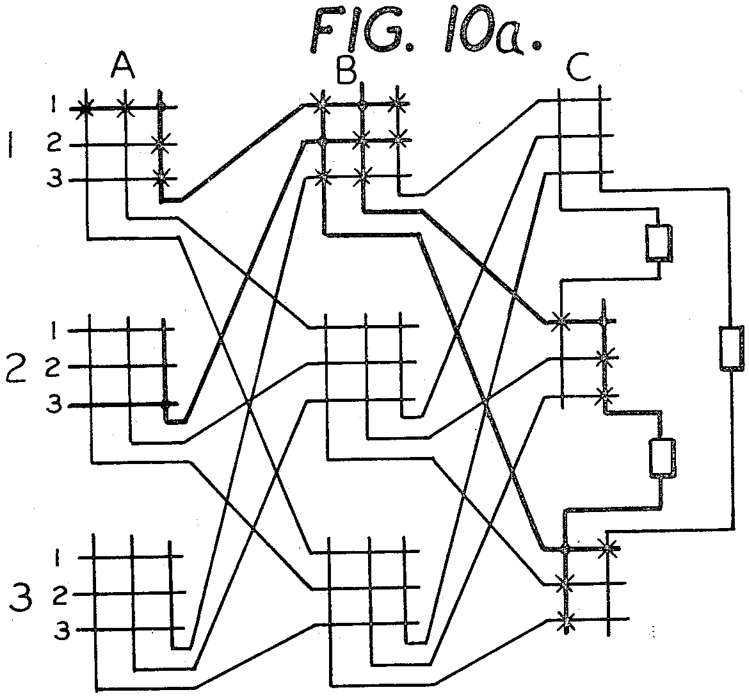
FIG. 10*a* is a pictorial illustration, similar to FIG. 5, showing all the crosspoints for an illustrated link.
Figure 10B:
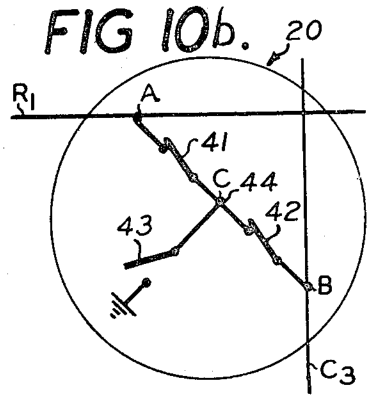
FIGS. 10*b* and 10*c* are pictorial illustrations, partially in schematic, of one of the illustrated crosspoints of FIG. 10*a* in accordance with the preferred embodiment of the present invention.
Figure 10C:
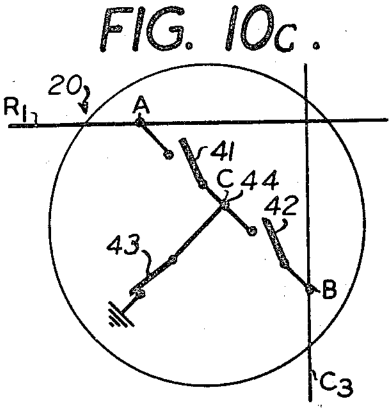

Now considering in detail all the impedances to ground which may exist in a generic link and, referring, by way of example, to an interconnection network with three stages, each including three arrays, as shown in FIG. 10*a*. As shown by way of example in FIG. 10*a*, the link has six conducting 1A13, 1B12, 2C12, 3C11, 1B21 and 2A33 and six leakage impedances to ground of crosspoints in the conducting state, denoted by a dot representing a closed crosspoint. Furthermore, there are sixteen impedances to ground of open crosspoints, denoted by an X in FIG. 10*a*. As shown and preferred, on the rows there will be the impedance of the SCR 56 with open circuit, or in any case of switch 41, and on the columns the impedance of switch 42, as shown in FIG. 10*b* which represents crosspoint 1A12 closed and in particular in FIG. 10*c* which shows the same crosspoint open. It is important to note that the conversation circuit has a voltage value *Vcc*, so that when the crosspoint is open and, therefore, short-circuited to ground, as previously explained, the series diode 62 is reverse biased with a voltage corresponding to *Vcc*. Since the anode-cathode junction capacitance of a diode highly decreases as a function of the reverse bias voltage, the grounding of series switches 41 through 42 through the junction point C (44) of the system, through switch 43 (FIG. 2*a*) in accordance with the present invention, minimizes capacitive loads to ground.

COMPENSATION CIRCUIT

Figure 11:
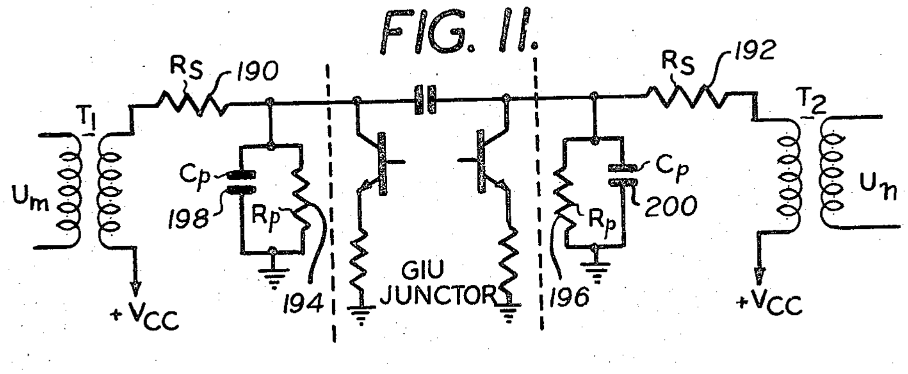
FIG. 11 is a schematic diagram, similar to FIG. 9, showing the associated leakage impedances.
Figures 12, 13, 14, 15, 16, 17:
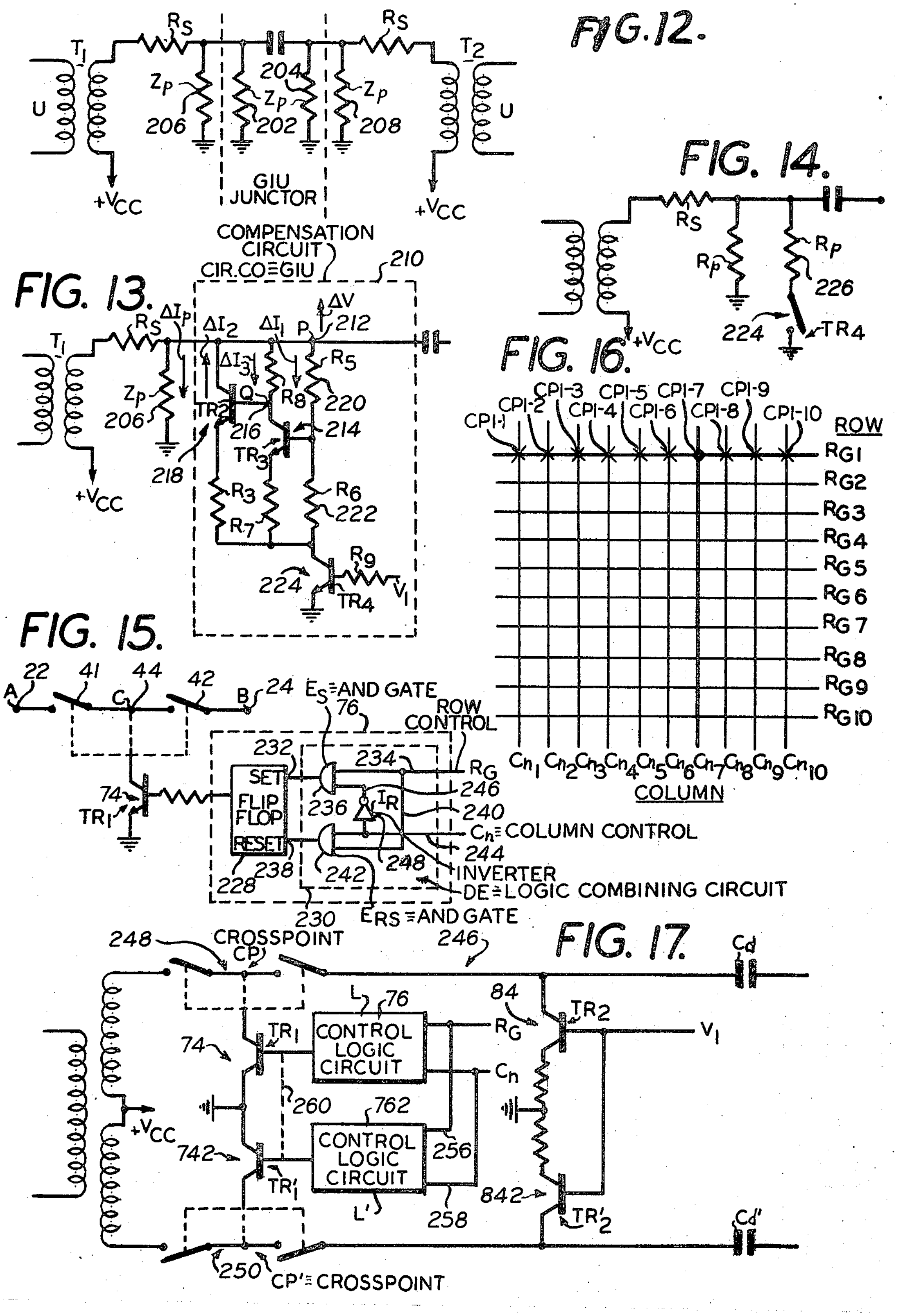
FIG. 12, is a simplified schematic diagram similar to FIG. 11, of the preferred compensating embodiment of the present invention.
FIG. 13 is a schematic diagram, of a portion of the circuit of FIG. 12, showing the preferred compensating portion.
FIG. 14 is a schematic diagram, similar to FIG. 13, with the addition of a switch in series with the compensating portion of FIG. 13.
FIG. 15 is a schematic diagram of the logic circuit control portion of the embodiment shown in FIG. 3, with the remainder of the crosspoint interconnection being shown illustratively.
FIG. 16 is a pictorial illustration, similar to FIGS. 6*a* 6*b* and 6*c*, of a selected crosspoint in an array.
FIG. 17 is a schematic diagram, partially in block, of a two-wire crosspoint configuration in accordance with the preferred embodiment of the present invention, the crosspoint interconnections being shown illustratively.

As will be explained in greater detail hereinafter, the effect of any leakage impedance $R_p$ which may be present at conducting or closed crosspoints, may be minimized by the preferred compensating circuit of FIG. 12. FIG. 11 illustrates the link between subscribers $U_m$ and $U_n$, where $R_S$ (190 and 192) denotes the respective series resistance or impedance resulting from the addition of all the crosspoint resistances in the link half-sections. The preferred compensating circuit shown in FIG. 12 is a simplified representation of the circuit of FIG. 11 wherein a negative impedance-$Z_p$ (202 and 204) to ground has been inserted to each of the link half-sections, which, if made equal to impedance $Z_p$ (206 and 208), (where $Z_p$ indicates the paralleling between the respective $R_p$ and $C_p$ (194–198 and 196–200) of FIG. 11) neutralizes all the leakage impedances to ground. Preferably, this negative impedance is obtained from the junctors 186–188, as will be described in greater detail hereinafter. Generally, a telephone interconnection network includes a plurality of junctors so that it is particularly economical to achieve compensation by use of these junctors. As will be explained in greater detail hereinafter, the desired negative impedance $Z_p$ is is preferably obtained by replacing or modifying the current generator portion of the junctor.

Referring now to FIG. 13. The compensating circuit 210, as shown and preferred in FIG. 13, provides the desired negative impedance-$Z_p$ by modifying the current generator of the conventional junctor for the new compensating function. The signal applied to point P (212) of the speech circuit is inverted by a transistor 214 ($TR_3$); that is, a signal proportional to the signal at point P (212) and of opposite sign will appear at point Q (216). This inverted signal drives a second transistor 218 ($TR_2$) which is the current generator associated with the junctor (transistor 84 of FIG. 3) thereby creating a current variation $\Delta I_2$ in a direction opposite to the one imposed by the signal $\Delta V$ applied to point P (212). Thus, transistor 218 provides the desired negative impedance-$Z_p$. It should be noted that transistor 214 with its bias resistances $R_5$ and $R_6$ (220 and 222) represents the positive impedance. Preferably, the values of the components comprising the compensating circuit 210 (CIR. CO) are chosen so that $\Delta I_2=\Delta I_1+\Delta I_3+\Delta I_p$, where $\Delta I_1$ is the current flowing through resistance 220 due to the effect of $\Delta V$, $\Delta I_2$ and the current flowing in the opposite direction to $\Delta I_1$; $\Delta I_3$ is the driving current for transistor 218 due to the effect of transistor 214; and $\Delta I_p$ is the leakage current due to $Z_p$ (206). A transistor 224 ($TR_4$) is operatively connected in the configuration to provide a switch in series with the compensating circuit negative impedance 226 ($-R_p$), as shown and preferred in FIGS. 13 and 14. Transistor switch 224 provides the control function of biasing the junctor. When a voltage or potential $V_1$ is applied to the base of transistor 224, the transistor 224 becomes saturated and conducts, bias current thereby flowing through the speech circuit. When $V_1=0$, transistors 216, 218 and 224 are inhibited and the bias current does not flow through the speech circuit.

CONTROL LOGIC PORTION

Now that the preferred single crosspoint network 20 has been described as well as a preferred utilization thereof in a space-division telephone network 104, the preferred control logic (L) portion 76 of the crosspoint network 20 shall be described. Referring now to FIG. 15, the control logic portion 76, as shown in block in FIG. 3, preferably includes a conventional flip-flop 228 operatively connected to a logic combining circuit (DE) 230. The logic combining circuit or switch 230, provides the row control (RG) to either the set 232 (S), through line 234 and AND gate 236 (ES), or to the reset 238 (RS) of the flip-flop 228, through line 240 and another AND gate 242

(ERS), thereby either saturating or inhibiting transistor 74 and, hence, controlling the operation of crosspoint network 20. The column (Cn) control reaches reset 238 (RS) through line 244 and AND gate 242 but, simultaneously, it also reaches AND gate 236 through line 246 and inverter 248 (IR). If desired, however, flip-flop 228 could be driven directly by a control signal directly applied to the set 232 terminals of the flip-flop 228, in place of the use of the preferred switch 230. However, the use of switch 230 to drive the flip-flop 228 is preferred as will become apparent from the following example of FIG. 16 which shows a 10-by-10 array. For purposes of illustration, assume that the crosspoint at the point of intersection between row 1 and column 7 (crosspoint 1–7) is to be opened. Furthermore, as shown in FIG. 16, all the remainder of the crosspoints in the row, that is, 1–1, 1–2, 1–3, 1–4, 1–5, 1–6, 1–8, 1–9, 1–10 and in the column, that is, 2–7, 3–7, 4–7, 5–7, 6–7, 7–7, 8–7, 9–7 and 10–7, of which crosspoint 1–7 is part, are already open. An OFF control applied to all the points in row 1 will open crosspoint 1–7 while leaving all the remaining points 1–1, 1–2, 1–3, 1–4, 1–5, 1–6, 1–8, 1–9 and 1–10 open. However, a closure control for crosspoint 1–7, will have to be applied to the point 1–7 exclusively. In other words, this closure control is obtained as an AND between a row (RG) control and a column (Cn) control (selection by coordinates). Therefore, in order to close the crosspoint between row 1 and column 7 (crosspoint 1–7), a control is applied to row (R1) and another control to column (Cn7). Simultaneously, the switch 230 will apply a control to the set 232 of crosspoint 1–7 and to reset 238 of all the remaining crosspoints in row $R_1$, thereby leaving them in the state they had assumed prior to aperture. If it is now desired to open crosspoint 1–7, instead, only the row control will have to be applied; no column control need be applied. For security sake, it is advisable, before commanding the closure of a crosspoint, to make sure that all the remaining points are open and that the flip-flop 228 which drives transistor 74 is saturated. Since our control logic 76 does not include any grounding control (or aperture control) for each single column, an aperture control to all the idle arrays to which the desired column is part, will be obtained by grounding all the points in the column which belongs to the idle rows. The crosspoints belonging to engaged rows will be open as they had been grounded upon closure of the related links.

TWO-WIRE CROSSPOINT NETWORK

The crosspoint network of the present invention, if desired, may be utilized in a two-wire circuit 246, such as shown and preferred in FIG. 17. The two-wire crosspoint network preferably includes two crosspoint networks 20 of the type described with reference to FIG. 3. One application of such a two-wire circuit is to control two crosspoints 248 and 250 (CP and CP′) by sending identical controls to the associated control logic portions 76 and 762 (L and L′) of the respective crosspoints 248 and 250, logic portions 76 and 762 being coupled in parallel via lines 256 and 258. Another application of such a two-wire circuit comprises eliminating one of the logic portions (762, for example) and driving both transistors 74 and 742 (TR1 and TR1′), and hence, the two crosspoints 248 and 250, by means of a single logic circuit 76. In this application (only one logic circuit), the output from the logic circuit 76 is directly coupled in parellel to transistor 742 via path 260, indicated by dotted lines in FIG. 17, and to transistor 74.

It is to be understood that the above described embodiments of the invention are merely illustrative of the principles thereof and that numerous modifications and embodiments of the invention may be derived within the spirit and scope thereof.

What is claimed is:

1. A crosspoint switching network for interconnecting at least two points to which an information signal is to be supplied, said network having an open circuit condition and a closed circuit condition, said network comprising three switching means operatively connected together at a common junction point interposed between said two points to be connected together, two of said three switches being operatively connected in series between said two points, said series connected switches being semiconductor means, said third switch being shunted between said junction point and ground and comprising third semiconductor means; control means operatively connected to said third switch semiconductor means for driving said third semiconductor means in accordance with a crosspoint switching function for controlling the condition of said network by controlling said third switch means in accordance with said function, said third switch providing a short to ground in said network open circuit condition and an open circuit to ground in said network closed circuit condition in accordance with said function, said two series connected switches being conducting in said network closed circuit condition and inhibited in said network open circuit condition; first bias voltage supply means operatively connected to the input of one of said series semiconductor switches, a fourth semiconductor means operatively connected in parallel to said junction point, and second voltage supply means operatively connected to said junction point through said fourth semiconductor means, whereby said network has a low ON impedance in said network closed circuit condition and a high OFF impedance in said network open circuit condition.

2. A crosspoint switching network for interconnecting at least two points to which an information signal is to be supplied, said network having an open circuit condition and a closed circuit condition, said network comprising three switching means operatively connected together at a common junction point interposed between said two points to be connected together, two of said three switches being operatively connected in series between said two points, said series connected switches being semiconductor means, said third switch being shunted between said junction point and ground and comprising third semiconductor means; control means operatively connected to said third switch semiconductor means for driving said third semiconductor means in accordance with a crosspoint switching function for controlling the condition of said network by controlling said third switch means in accordance with said function, said third switch providing a short to ground in said network open circuit condition and an open circuit to ground in said network closed circuit condition in accordance with said function, said two series connected switches being conducting in said network closed circuit condition and inhibited in said network open circuit condition; and compensating means operatively connected to said series semiconductor switches, said compensating means including a fourth semiconductor means, said network having an associated passive impedance in said closed circuit condition, said compensating means providing a negative impedance substantially equivalent to said passive impedance in said closed circuit condition, whereby said network has a low ON impedance in said network closed circuit condition and a high OFF impedance in said network open circuit condition.

3. A crosspoint switching network for interconnecting at least two points to which an information signal is to be supplied, said network having an open circuit condition and a closed circuit condition, said network comprising three switching means operatively connected together at a common junction point interposed between said two points to be connected together, two of said three switches being operatively connected in series between said two points, said series connected switches being semiconductor means, said third switch being shunted between said junction point and ground and comprising third semiconductor means; and control means operatively connected to said third switch semiconductor means for driving said third semiconductor means in accordance with a crosspoint switching function for controlling the condition of said network by controlling said third switch means in accordance with said function, said third switch providing a short to ground in said network open circuit condition and an open circuit to ground in said network closed circuit condition in accordance with said function, said two series connected switches being conducting in said network closed circuit condition and inhibited in said network open circuit condition; one of said series semiconductor switches comprising a silicon controlled rectifier means having a conduction state in said closed circuit condition and an inhibited state in said open circuit condition, and the other of said series semiconductor switches comprising a first diode means having a conduction state in said closed circuit condition and an inhibited state in said open circuit condition, said first diode means state being dependent on the state of said silicon controlled rectifier means whereby said network has a low ON impedance in said network closed circuit condition and a high OFF impedance in said network open circuit condition.

4. A crosspoint switching network in accordance with claim 3 wherein said third semiconductor switch comprises a first transistor means, and said crosspoint network further comprises a second transistor means operatively connected to said first diode means at the output thereof, said silicon controlled rectifier means being operatively connected to the input of said first diode means.

5. A crosspoint switching network in accordance with claim 4 wherein said crosspoint network further comprises first bias voltage supply means operatively connected to said silicon controlled rectifier means and second voltage supply means operatively connected to said junction point, and said control means comprises logic means responsive to control pulses representative of said crosspoint switching function.

6. A crosspoint switching network in accordance with claim 5 wherein a second diode means is operatively connected between said junction point and said second voltage supply means, and said second transistor means includes a base, an emitter, and a collector, said collector being operatively connected to said first diode means output, said base being adapted to receive a third voltage supply.

7. A crosspoint switching network in accordance with claim 5 wherein said open circuit condition said control means biases said first transistor means to saturation, said first transistor means providing a short to ground for current supplied by said second power supply means in said saturation condition; and said silicon controlled rectifier means, said first diode means and said second transistor means are inhibited when said first transistor means is saturated.

8. A crosspoint switching network in accordance with claim 6 wherein in said open circuit condition said control means biases said first transistor means to saturation, said first transistor means providing a short to ground for current supplied by said second power supply means in said saturation condition; and said silicon controlled rectifier means, said first diode means and said second transistor means are inhibited when said first transistor means is saturated.

9. A crosspoint switching network in accordance with claim 5 wherein said second transistor means is adapted to receive a third supply voltage; said silicon controlled rectifier means includes an anode, a cathode and a gate, said gate being at said junction point, said anode being operatively connected to said first bias voltage supply means and said first diode means being operatively connected to said cathode; and a bias impedance means is operatively connected between said junction point and said cathode; and when said control function corresponds to said closed circuit condition said second transistor means is driven to saturation by receiving a voltage less than said second voltage supply, said first transistor means is inhibited, a bias current flows through said bias impedance for biasing the gate-cathode junction of the silicon controlled rectifier means to conduction, said silicon controlled rectifier means providing a bias current to said first diode means in said conduction state for biasing said first diode means to conduction, and said second transistor means acts as a current generator.

10. In a space-division telephone network having a plurality of subscribers and an interconnection network for establishing a link between at least a pair of subscribers, wherein said interconnection network is divided into a plurality of stages, each stage comprising a plurality of matrix arrays, each array comprising at least a row and a column, the improvement comprising a crosspoint switching network interconnecting said row and said column, said crosspoint switching network having an open circuit condition and a closed circuit condition, said crosspoint network including three switching means operatively connected together at a common junction point interposed between said row and said column to be connected together, two of said three switches being operatively connected in series between said row and said column, said series connected switches being semiconductor means, said third switch being shunted between said junction point and ground and comprising a third semiconductor means; and further including control means operatively connected to said third switch semiconductor means for driving said third semiconductor means in accordance with a crosspoint switching function for controlling the condition of said network by controlling said third switch means in accordance with said function, said function being determined by a pair of control pulses, one of said pulses being a row control, the other of said pulses being a column control, said third switch providing a short to ground in said network open circuit condition and an open circuit to ground in said network closed circuit condition in accordance with said function, said two series connected switches being conducting in said network closed circuit condition and inhibited in said network open circuit condition; one of said series semiconductor switches comprising a silicon controlled rectifier means having a conduction state in said closed circuit condition and an inhibited state in said open circuit condition, and the other of said series semiconductor switches comprising a first diode means having a conduction state in said closed circuit condition and an inhibited state in said open circuit condition, said first diode means state being dependent on the state of said silicon controlled rectifier means, whereby said crosspoint network has a low ON impedance in said network closed circuit condition and a high OFF impedance in said network open circuit condition.

11. A space-division telephone network in accordance with claim 10 wherein said third semiconductor switch comprises a first transistor means, and said crosspoint network further comprises a second transistor means operatively connected to said first diode means at the output thereof, said silicon controlled rectifier means being operatively connected to the input of said first diode means.

12. A space-division telephone network in accordance with claim 11 wherein said control means comprises logic means responsive to said control pulse pair.

13. In a space-division telephone network having a plurality of subscribers and an interconnection network for establishing a link between at least a pair of subscribers, wherein said interconnection network is divided into a plurality of stages, each stage comprising a plurality of matrix arrays, each array comprising at least a row and a column, the improvement comprising a crosspoint switching network interconnecting said row and said column, said crosspoint switching network having an open circuit condition and a closed circuit condition, said crosspoint network including three switching means operatively connected together at a common junction point interposed between said row and said column to be connected together, two of said three switches being operatively connected in series between said row and said column, said series connected switches being semiconductor means, said third switch being shunted between said junction point and ground and comprising a third semiconductor means; and further including control means operatively connected to said third switch semiconductor means for driving said third semiconductor means in accordance with a crosspoint switching function for controlling the condition of said network by controlling said third switch means in accordance with said function, said function being determined by a pair of control pulses, one of said pulses being a row control, the other of said pulses being a column control, said third switch providing a short to ground in said network open circuit condition and an open circuit to ground in said network closed circuit condition in accordance with said function, said two series connected switches being conducting in said network closed circuit condition and inhibited in said network open circuit condition; said link including an associated junctor means, said junctor means including compensating means operatively connected to said crosspoint network, said crosspoint network having an associated closed circuit condition passive impedance, said compensating means providing a negative impedance substantially equivalent to said associated passive impedance present at said row and column within said link, whereby said crosspoint network has a low ON impedance in said network closed circuit condition and a high OFF impedance in said network open circuit condition.

14. A space-division telephone network in accordance with claim 13 wherein said junctor means comprises current generator means operatively connected to the output of one of said series semiconductor switch means, said compensating means including said current generator means and a transistor means operatively connected to said current generator means for providing said negative impedance, whereby any leakage impedance associated with said crosspoint network closed circuit condition is minimized.

References Cited

UNITED STATES PATENTS

| | | | |
|---|---|---|---|
| 3,089,963 | 5/1963 | Ojorup | 307—254 |
| 3,550,088 | 12/1970 | Jones | 179—18 GF |
| 3,558,826 | 1/1971 | Schluter | 179—18 GE |
| 3,343,129 | 9/1967 | Schmitz | 179—18 GF |
| 3,531,773 | 9/1970 | Beebe | 179—18 GF |
| 2,951,125 | 8/1960 | Andrews | 307—241 |
| 3,456,084 | 7/1969 | Haselton | 179—18 GF |
| 3,542,963 | 11/1970 | Aagaard | 179—18 GF |

THOMAS W. BROWN, Primary Examiner

U.S. Cl. X.R.

307—252 J; 340—166 R